United States Patent
Hwang et al.

(10) Patent No.: US 7,007,733 B2
(45) Date of Patent: Mar. 7, 2006

(54) APPARATUS FOR MANUFACTURING COLLIMATOR

(75) Inventors: Myeon-soon Hwang, Suwon (KR); Byung-gon Kim, Seoul (KR); Suk-chan Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 273 days.

(21) Appl. No.: 10/176,581

(22) Filed: Jun. 24, 2002

(65) Prior Publication Data

US 2003/0150564 A1    Aug. 14, 2003

(30) Foreign Application Priority Data

Feb. 14, 2002    (KR) .................................. 2002-7991

(51) Int. Cl.
  *B32B 31/00*    (2006.01)
  *G02B 6/36*    (2006.01)
  *B25B 27/14*    (2006.01)
(52) U.S. Cl. ...................... 156/423; 156/293; 156/294; 385/76; 385/88; 385/90; 29/281.1; 29/282
(58) Field of Classification Search ................ 156/293, 156/294, 423; 385/76, 78, 79, 80, 88, 90, 385/91; 29/281.1, 281.4, 281.5, 281.6, 282, 29/559
See application file for complete search history.

(56) References Cited

U.S. PATENT DOCUMENTS

| 3,902,784 A | * | 9/1975 | Dakss et al. .................. 385/76 |
| 5,048,912 A | | 9/1991 | Kunikane et al. |
| 5,555,330 A | | 9/1996 | Pan et al. |
| 5,738,753 A | * | 4/1998 | Schwar et al. ........... 156/379.8 |
| 6,019,522 A | | 2/2000 | Kim |
| 6,168,319 B1 | | 1/2001 | Francis |

OTHER PUBLICATIONS

English Translation of Taiwanese Office Action issued Jul. 16, 2003.

* cited by examiner

*Primary Examiner*—Blaine Copenheaver
*Assistant Examiner*—Justin Fischer
(74) *Attorney, Agent, or Firm*—Staas & Halsey LLP

(57) ABSTRACT

An apparatus for manufacturing a collimator by attaching a glass tube assembly, which includes a pigtail having a fiber, and a GRIN lens, which is coaxially arranged with the pigtail, into a metal sleeve having a tube shape. The apparatus includes a supporting part, a sleeve grip part connected to the supporting part and having at least one holder for disposing the metal sleeve therein, a fiber chucking part provided above the sleeve grip part and chucking the fiber, and a lift unit lifting and lowering the fiber chucking part to control the glass tube assembly inserted in the metal sleeve to move up and down along a longitudinal direction of the metal sleeve. With this configuration, the glass tube assembly is conveniently fixedly fitted into the metal sleeve.

10 Claims, 7 Drawing Sheets

APPARATUS FOR MANUFACTURING COLLIMATOR

CROSS-REFERENCE TO RELATED APPLICATIONS

This application claims the benefit of Korean Application No. 2002-7991, filed Feb. 14, 2002, in the Korean Intellectual Property Office, the disclosure of which is incorporated herein by reference.

BACKGROUND OF THE INVENTION

1. Field of the Invention

The present invention relates an apparatus for manufacturing a collimator having a glass tube assembly and a metal sleeve, and more particularly, to an apparatus for automatically assembling the glass tube assembly into the metal sleeve.

2. Description of the Related Art

A collimator is an optical communication device transforming light received from a light source into a beam of parallel rays. The collimator is usually employed as a component in a variety of equipment, such as optical communication equipment and semiconductor manufacturing equipment, which is in need of parallel rays.

As shown in FIG. 1, a collimator 10 generally includes a pigtail 12 and a GRIN (gradient index) lens 14 which are arranged along a coaxial line, a glass tube 15 accommodating and supporting the pigtail 12 and the GRIN lens 14, and a metal sleeve 16 protecting the glass tube 15 in an outside thereof.

The pigtail 12 is made of glass, and a fiber 13 forming an incidence path of the light is provided in one end part of the pigtail 12, through which the light is transmitted. In the other end part of the pigtail 12 is formed a first inclined part 12a having a predetermined inclination angle with a plane having the coaxial line.

Further, the GRIN lens 14 disposed coaxially with the pigtail 12 is provided with a second inclined part 14a in one end corresponding to the first inclined part 12a of the pigtail 12. The first inclined part 12a of the pigtail 12 and the second inclined part 14a of the GRIN lens 14 are disposed obliquely to the plane to face each other.

To manufacture the collimator 10 having the above configuration, the GRIN lens 14 is first inserted into the glass tube 15, and fastened therein. Herein, the one end of the GRIN lens 14 which is formed with the second inclined part 14a is located inside the glass tube 15, and the other end thereof protrudes from the glass tube 15 by a predetermined length.

After the GRIN lens 14 is fixedly attached to and supported by one side of the glass tube 15, the pigtail 12 is inserted in the other side of the glass tube 15. Herein, the one end part of the pigtail 12 which is formed with the first inclined part 12a is inserted inside the glass tube 15 to mate with the second inclined part 14a of the GRIN lens 14 which has already been supportedly inserted inside the glass tube 15.

At this time, the first inclined part 12a of the pigtail 12 is disposed to be parallel to the second inclined part 14a of the GRIN lens 14 through an aligning process so as to obtain desired optical properties. Further, if the alignment between the pigtail 12 and the GRIN lens 14 complies with predetermined conditions of the desired optical properties, the pigtail 12 is fixedly attached to an inside of the glass tube 15.

Thereafter, the glass tube 15 accommodating and supporting the GRIN lens 14 and the pigtail 12 is inserted into the metal sleeve 16 having a tube shape, and then the glass tube 15 is fastened (fixedly coupled) to the metal sleeve 16 by applying an epoxy resin 17 to one end of the metal sleeve 16, so as to complete the manufacturing process of the collimator 10.

However, the conventional collimator 10 has been manually manufactured. That is, a combining process of assembling the glass tube 15 accommodating the pigtail 12 and the GRIN lens 14 with the metal sleeve 16 is manually performed. As a result, it is inconvenient and takes much time in manufacturing the collimator, thereby decreasing a productivity thereof. Moreover, a manufacturing efficiency and a reliability of the collimator are remarkably decreased.

SUMMARY OF THE INVENTION

Accordingly, the present invention has been made to overcome the above and other problems, and an object of the present invention is to provide an apparatus for manufacturing a collimator having a glass tube assembly and a metal sleeve.

Another object of the present invention is to provide an apparatus for manufacturing a collimator, in which not only a reliability of the collimator is increased but also a manufacturing time period of the collimator is reduced, thereby increasing the productivity thereof.

Additional objects and advantageous of the invention will be set forth in part in the description which follows and, in part, will be obvious from the description, or may be learned by practice of the invention.

These and other objects of the present invention may be achieved by providing an apparatus for manufacturing a collimator by fastening or fixedly attaching a glass tube assembly including a pigtail having a fiber and a GRIN lens coaxially arranged with the pigtail to a metal sleeve having a tube shape. The collimator manufacturing apparatus includes a supporting part, a sleeve grip part connected to the supporting part and having at least one holder holding the metal sleeve therein, a fiber chucking part provided above the sleeve grip part and chucking the fiber, and a lift unit lifting and lowering the fiber chucking part to control the glass tube assembly to be inserted in the metal sleeve along a longitudinal direction of the metal sleeve.

According to an aspect of the present invention, the sleeve grip part includes a fixed block formed with the holders recessed along a lengthwise direction thereof, and a movable block having one end rotatably combined with one end of the fixed block and the other end removably combined with the other end of the fixed block to hold and support the metal sleeve in the holders.

According to another aspect of the present invention, inside the movable block is provided a buffer member buffering and supporting the metal sleeve.

According to another aspect of the present invention, in the other end of the fixed block is formed a slit, and in the other end of the movable block is formed a locking pin inserted into and releasing from the slit selectively.

According to another aspect of the present invention, the locking pin is rotatably combined with the other end of the movable block.

According to another aspect of the present invention, the fiber chucking part includes a fixed bracket having a first chucking plate, a movable bracket having one end rotatably coupled to one end of the fixed bracket and the other end removably coupled to the other end of the fixed bracket, and a second chucking plate chucking the fiber in cooperation with the first chucking plate of the fixed bracket.

According to another aspect of the present invention, in the other end of the movable block is provided a magnet removably coupled to the other end of the fixed block.

According to another aspect of the present invention, the collimator manufacturing apparatus includes a fiber guiding block incorporated with and supported by the supporting part, disposed between the fiber chucking part and the sleeve grip part, and having at least one fiber passing part through which the fiber passes.

According to another aspect of the present invention, the lift unit includes a lifting block combined to the fiber chucking part and moving up and down together with the fiber chucking part, a pair of supporting blocks having one end slidably engaged with the lifting block and the other end supported by the supporting part, a cam provided between the supporting blocks above the lifting block and having an asymmetric curvature having a variable radius so as to lift and lower the lifting block at a predetermined height due to rotation thereof, and a link part linked to the cam and rotatably supported by the pair of supporting blocks and having opposite ends exposed to an outside of the supporting blocks.

According to another aspect of the present invention, the collimator manufacturing apparatus includes an elastic member provided between the fiber guiding block and the lifting block to maintain the lifting block to be spaced-apart from the fiber guiding block. A handle is provided in the link part.

According to another aspect of the present invention, the supporting part is provided with a winding part partially winding the free end part of the fiber thereon.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
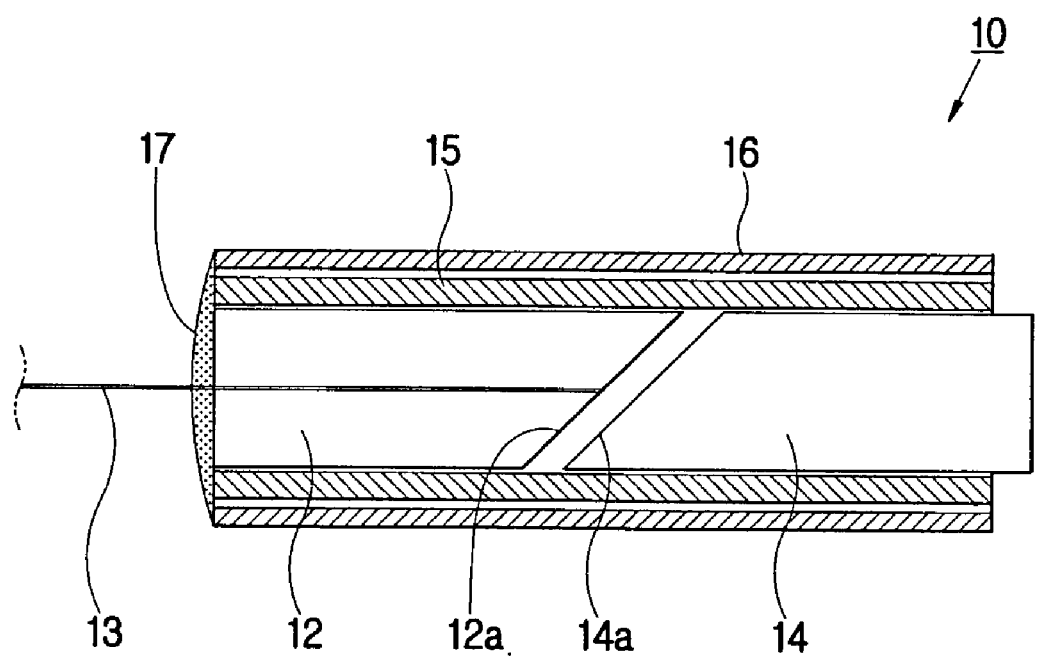
FIG. 1 is a sectional view of a collimator.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2:
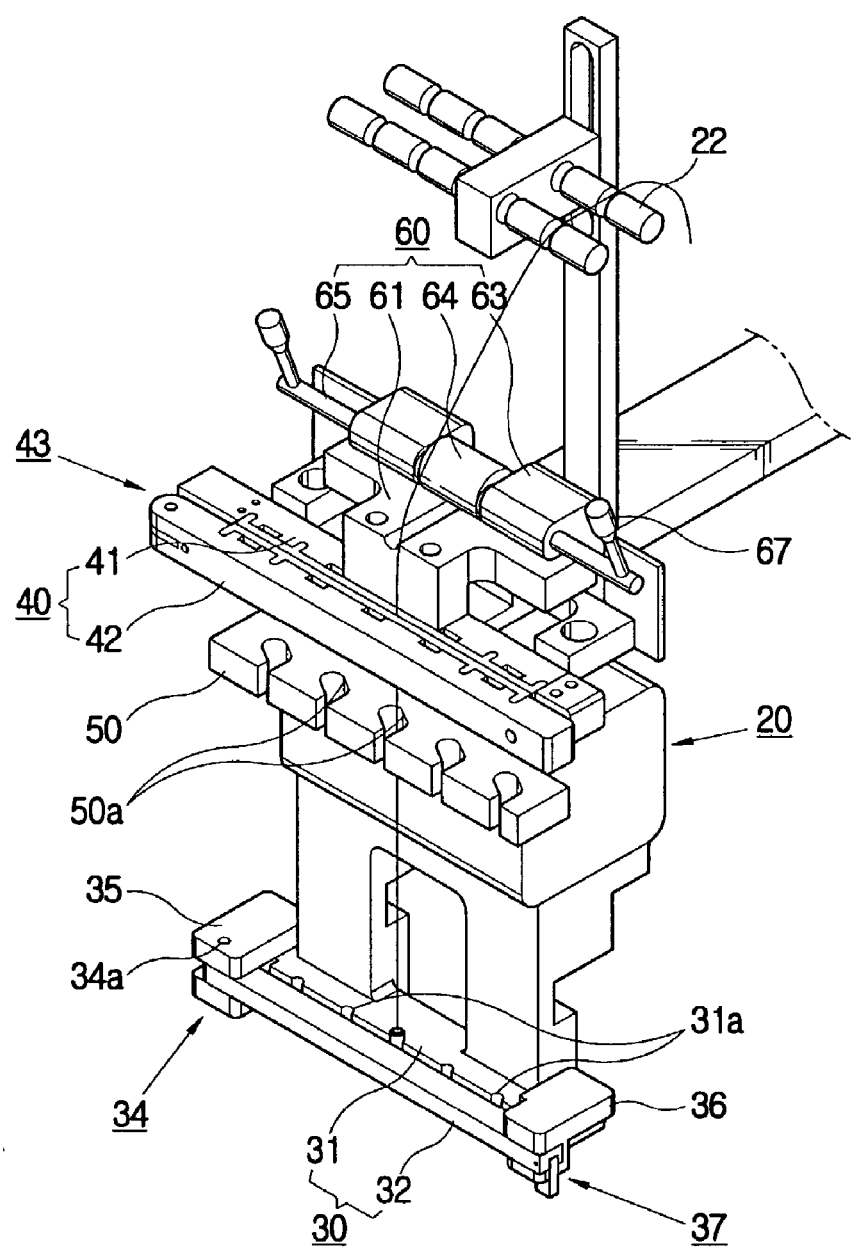
FIG. 2 is a perspective view of an apparatus according to an embodiment of the present invention for manufacturing the collimator of FIG. 1.
Figure 3:
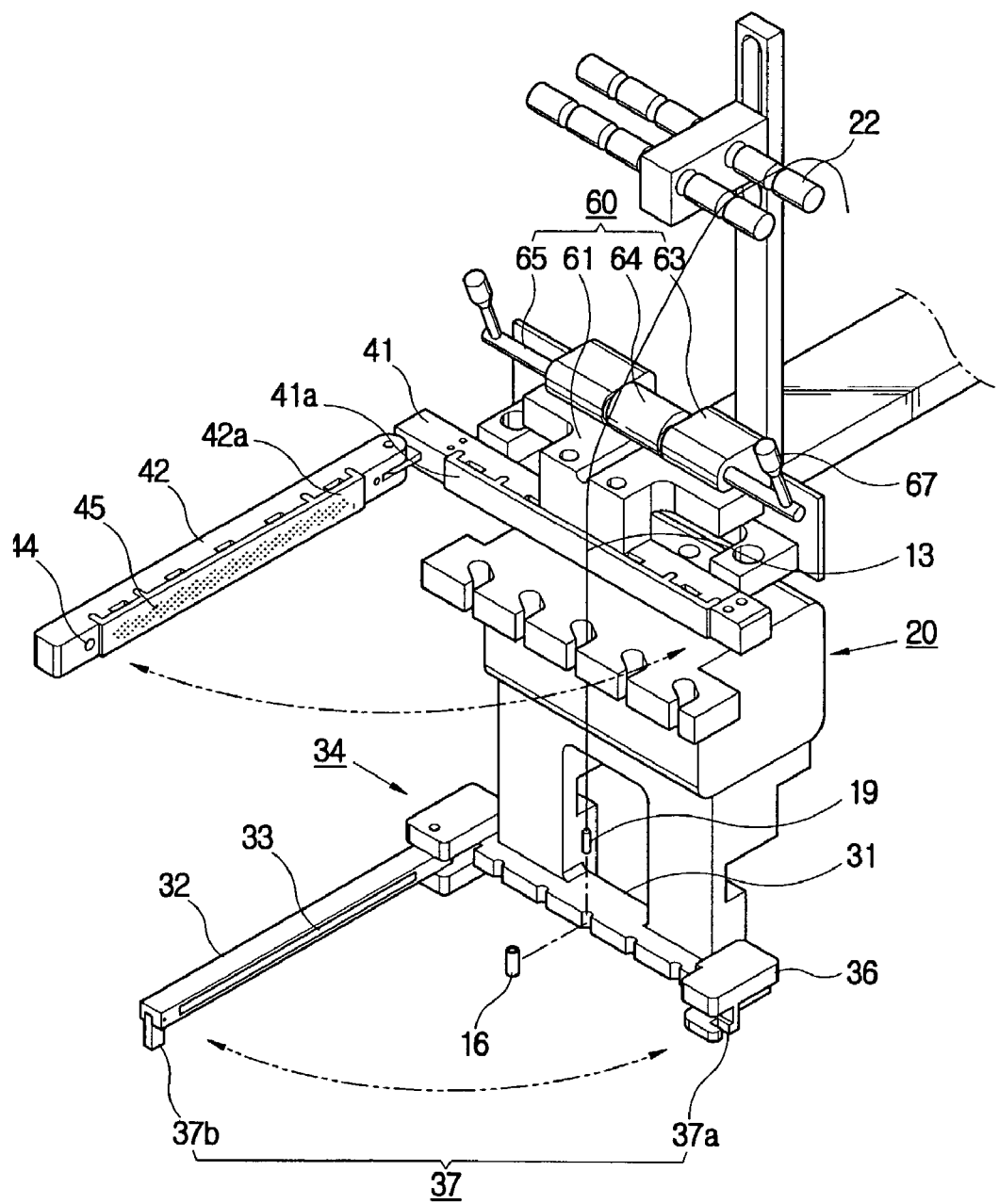
FIG. 3 illustrates a partial operation of the apparatus of FIG. 2.

According to an embodiment of the present invention, an apparatus for manufacturing a collimator, as shown in FIGS. 2 and 3, includes a supporting part 20, a sleeve grip part 30 gripping a metal sleeve (tube) 16, a fiber chucking part 40 chucking a fiber 13 of a glass tube assembly 19, and a lift unit 60 vertically lifting and lowering the glass tube assembly 19 disposed inside the metal sleeve 16 at a predetermined height in a lengthwise direction parallel to the metal sleeve 86 and the glass tube assembly 19.

The supporting part 20 supports the sleeve grip part 30, a fiber guiding block 50, etc., and is provided with a winding part 22 partially winding a free end part of the fiber 13 thereon.

The sleeve grip part 30 is provided with a plurality of holders 31a holding and supporting the metal sleeve 16 therein. The sleeve grip part 30 is provided with five holders 31a. Therefore, five glass tube assemblies 19 can be inserted into five metal sleeves 16 at once. However, the sleeve grip part 30 may be provided with more or less than the five holders 31a.

The sleeve grip part 30 includes a fixed block 31 formed with the holders 31a, and a movable block 32 rotatably combined with the fixed block 31. The holders 31a are recessed along the lengthwise direction of the fixed block 31. Therefore, the metal sleeves 16 are each fitted to the holders 31 of the fixed block 31, and then the movable block 32 is rotated to be combined with the fixed block 31, thereby preventing the metal sleeves 16 from being separated from the holders 31a.

Herein, between the movable block 32 and the fixed block 31 are provided a first hinge part 34 rotating the movable block 32 against the fixed block 31, and a locking part 37 locking the movable block 32 to the fixed block 31.

The first hinge part 34 includes a hinge pin 34a provided in one end of the movable block 32, and a hinge hole (not shown) provided in one end of the fixed block 31 so as to rotatably support the hinge pin 34a. Herein, the hinge hole may be directly provided in the fixed block 31 or as shown in the accompanying drawing, formed in a first dummy block 35 provided in the one end of the fixed block 31.

The locking part 37 includes a slit 37a formed in a second dummy block 36 provided in the other end of the fixed block 31, and a locking pin 37b provided in the other end of the movable block 32 to be selectively inserted into and released from the slit 37a. Herein, the locking pin 37b is rotatably combined to the other end of the movable block 32.

Thus, the locking pin 37b is released from the slit 37a by rotating, and then the movable block 32 is rotated outwardly from the fixed block 31 about an axis of the first hinge part 34. Thereafter, the metal sleeves 16 are each inserted into the holders 31a, and the movable block 32 is rotated toward the fixed block 31. Then, the locking pin 37b is locked to the slit 37a, thereby preventing the metal sleeves 16 fitted to the holders 31a from being separated from the holders 31a.

At this time, when the movable block 32 is rotated toward the fixed block 31, the movable block 32 pushes the metal sleeve 16 against the fixed block 31. If the movable block 32 presses the metal sleeve 16, the glass tube assembly 19 made of glass and inserted in the metal sleeve 16 can be broken. Therefore, it is desirable that inside the movable block 32 is provided a buffer member 33 buffering and supporting the metal sleeve 16.

On the other hand, besides the above configurations, the locking part 37 may include a magnet provided in the other end of the movable block 32 and removably coupled to the other end of the fixed block 31. In this case, the other end of the fixed block 31 includes a magnetic body corresponding to the magnet of the locking part 37.

The fiber chucking part 40 includes a fixed bracket 41 having a first chucking plate 41a and a movable bracket 42 having a second chucking plate 42a. The movable bracket 42 has one end rotatably coupled to one end of the fixed bracket 41, and the other end removably coupled to the other end of the fixed bracket 41. The second chucking plate 42a of the movable bracket 42 chucks the fiber 13 in cooperation with the first chucking plate 41a of the fixed bracket 41.

Herein, between one end of the movable bracket 42 and one end of the fixed bracket 41 is provided a second hinge part 43. The second hinge part 43 is similar to the above-described first hinge part 34 provided between the movable block 32 and the fixed block 31, and therefore repetitive description will be avoided.

In the other end of the movable bracket 42 is provided a magnet 44 removably coupled to the other end of the fixed bracket 41. Thus, in a state that the fiber 13 is disposed on the first chucking plate 41a of the fixed bracket 41, the movable bracket 42 is rotated toward the fixed bracket 41 about an axis of the second hinge part 43 and locked onto the fixed bracket 41 when the magnet 44 is magnetically coupled to the other end of the fixed bracket 41. As a result, the fiber 13 is chuked between the first and second chucking plates 41a and 41b. Herein, it is possible that between the first and second chucking plates 41a and 41b, a buffer member 45 is provided so as to prevent the fiber 13 chucked between the first and second chucking plates 41a and 41b from being damaged.

Between the fiber chucking part 40 and the sleeve grip part 30 is provided the fiber guiding block 50 supported by the supporting part 20. The fiber guiding block 50 is provided with a plurality of fiber passing parts 50a through which the fiber 13 passes.

On the other hand, the lift unit 60 includes a lifting block 61 combined with the fiber chucking part 40 to move up and down together with the fiber chucking part 40, a pair of supporting blocks 63 having one end slidably engaged with the lifting block 61 and the other end supported by the supporting part 20, a cam 64 rotatably disposed between the supporting blocks 63 above the lifting block 61 and having an asymmetric curvature with a variable radius, and a link part 65 linked to the cam 64 and rotatably supported by the pair of supporting blocks 63 and having opposite ends exposed to an outside of the supporting blocks 63.

In the link part 65 is provided a handle 67, and between the fiber guiding block 50 and the lifting block 61 is provided an elastic member (not shown) elastically maintaining the lifting block 61 to be spaced-apart from the fiber guiding block 50.

Figure 4A:
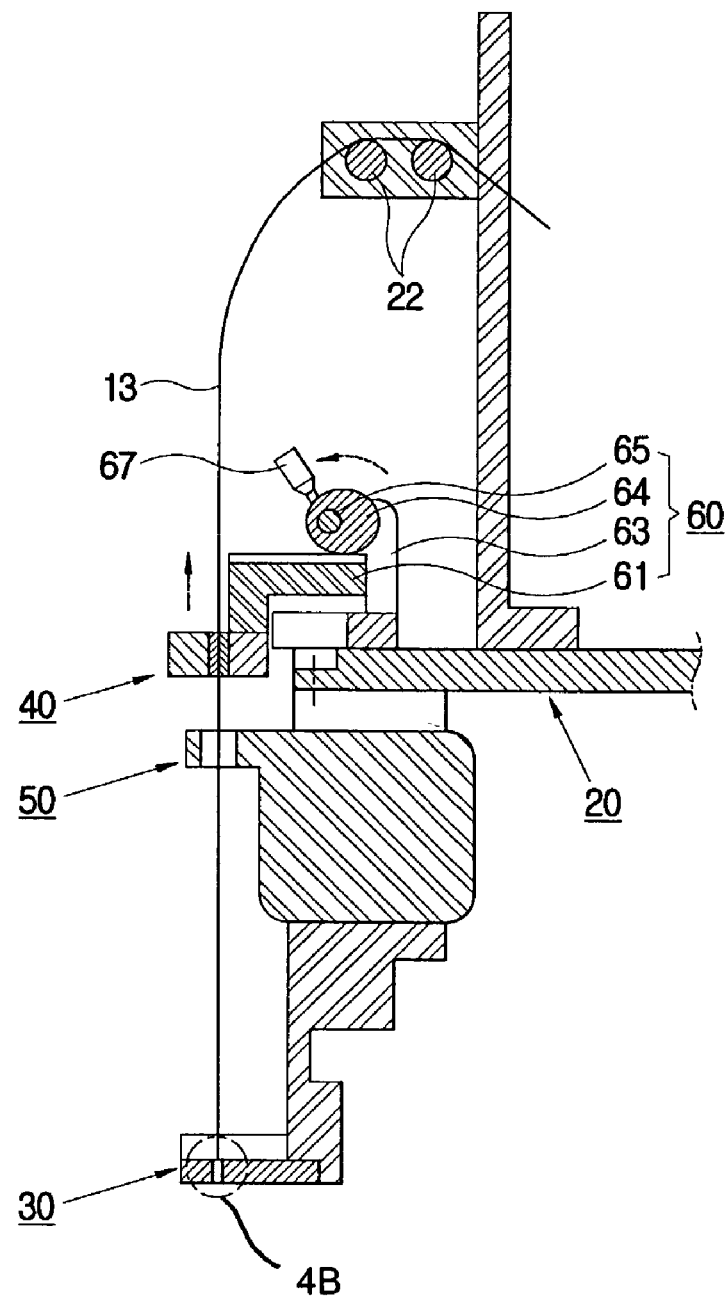
FIGS. 4A and 4B, and FIGS. 5A and 5B illustrate processes of manufacturing the collimator in order in the apparatus of FIG. 2.
Figure 4B:
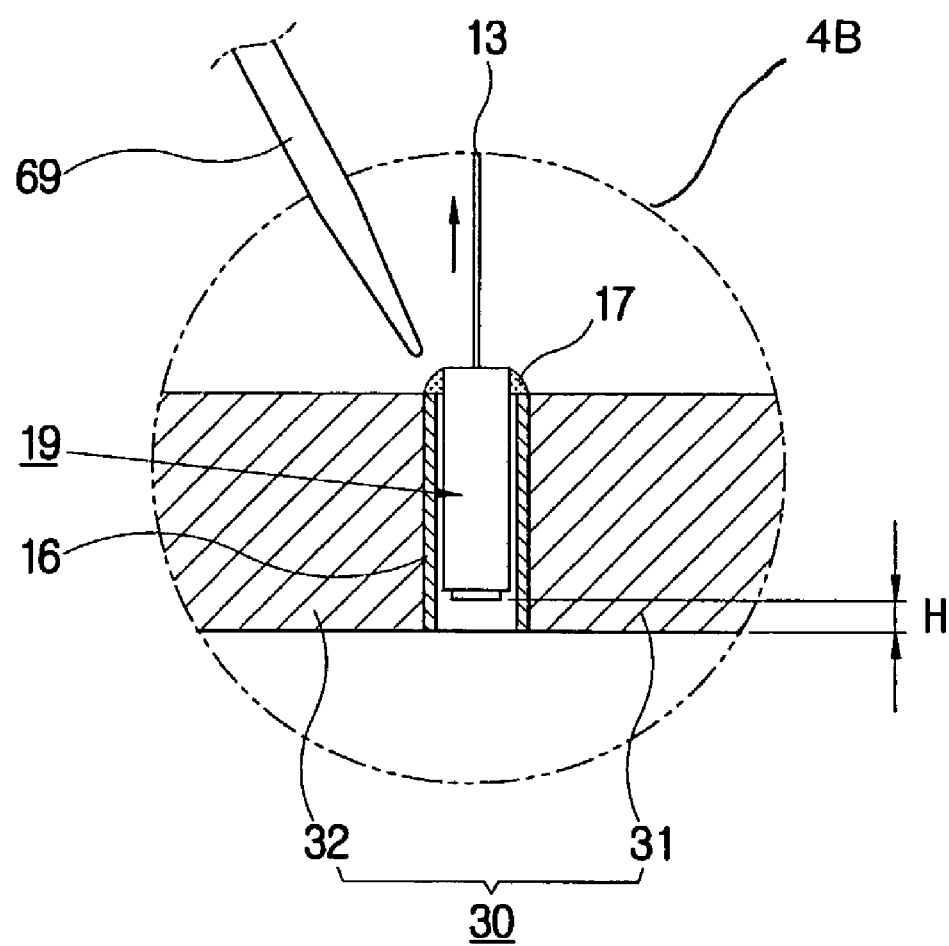
Figure 5A:
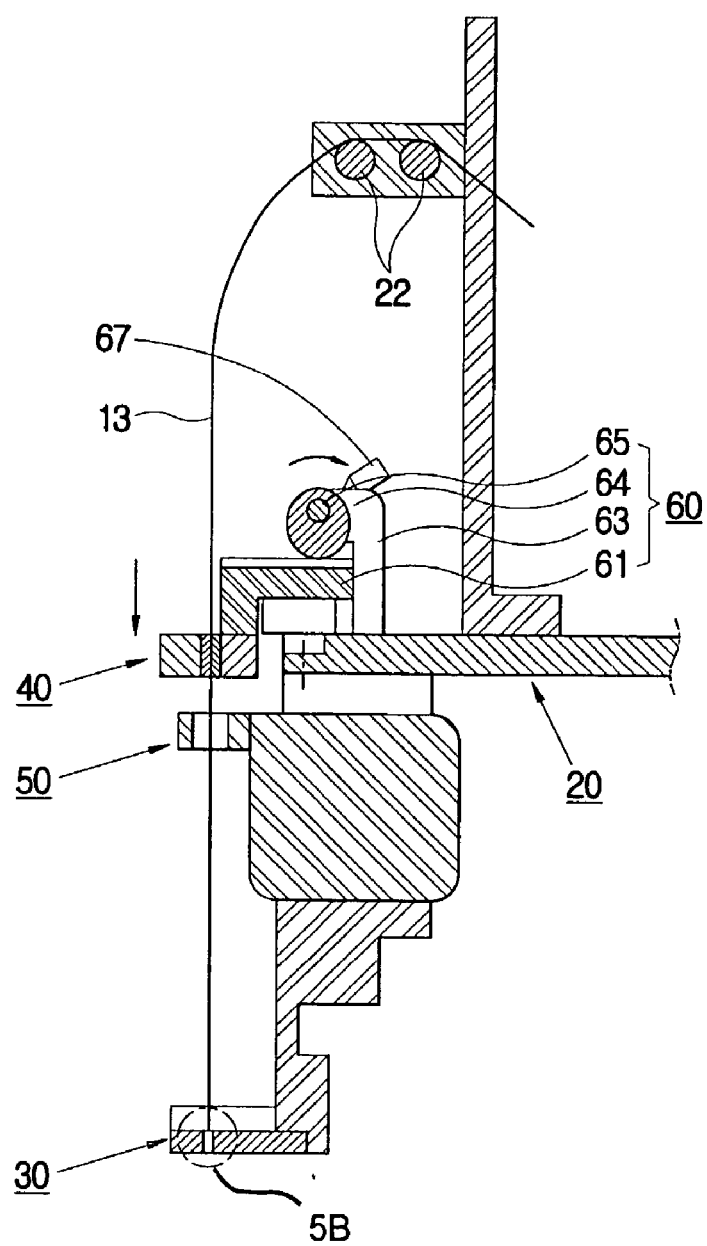
Figure 5B:
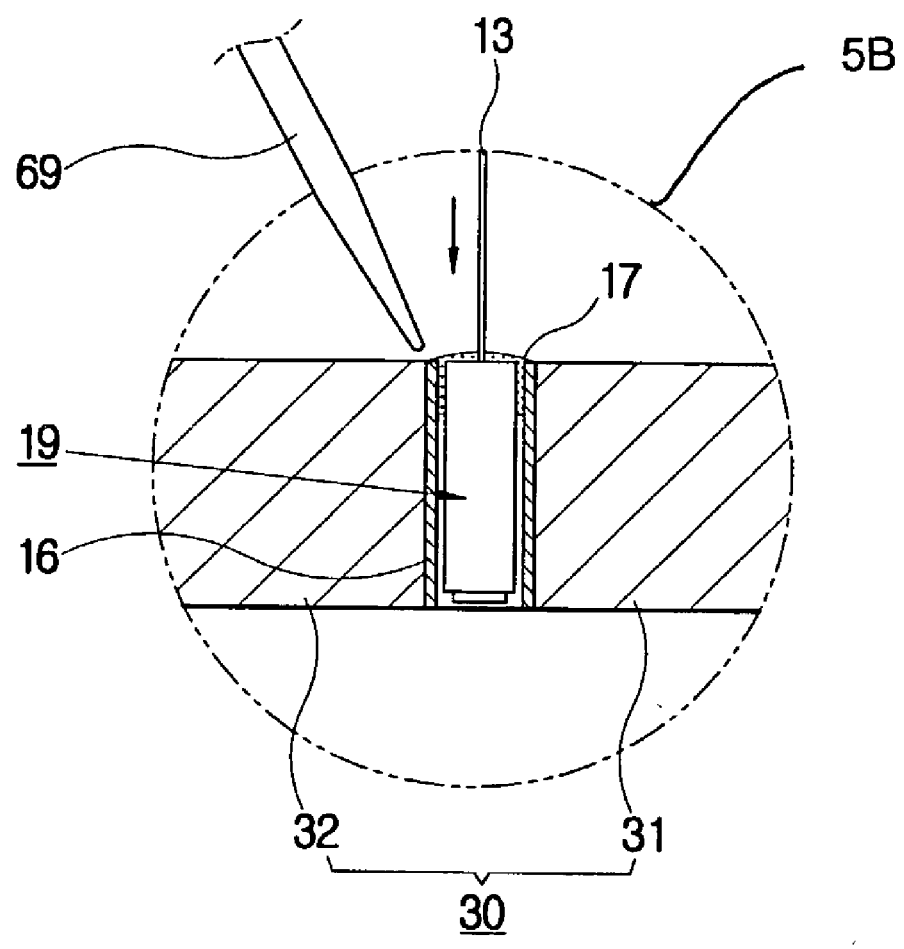

Therefore, if a user holds the handle 67 to rotate the link part 65 at a predetermined angle to allow a long radius part of the cam 64 to push an upper part of the lifting block 61, the lifting block 61 moves down toward the fiber chucking part 40 and away from the supporting block 63 due to a rotation of the cam 64 as shown in FIG. 5A. On the contrary, if the user holds the handle 67 to reversely rotate the link part 65 to allow a short radius part of the cam 64 to push the upper part of the lifting block 61, the lifting block 61 is restored to an original position by an elastic force of the elastic member as shown in FIG. 4A. Thus, according to a movement of the lifting block 61, the glass tube assembly 19 moves up and down inside the metal sleeve 16 along the longitudinal direction of the metal sleeve 16 as shown in FIGS. 4B and 5B.

The fiber chucking part 40 and the lifting block 61 of the lift unit 60 are slidably mounted on the supporting part 20 by using a guide rail and a guide groove formed on respective one of the supporting part 20, the fiber chucking part 40, and the lifting block 61 of the lift unit 60. The lifting block 61 of the lift unit 60 and the supporting blocks 63 may have a respective one of the guide rail and the guide groove to allow the lifting block 61 of the lift unit 60 coupled to the fiber chucking part 40 to move in the longitudinal direction.

Since the fixed bracket 41 of the fiber chucking part 40 is movably mounted on the supporting part 20 and coupled to the lifting block 61 of the lift unit 60, another elastic member is disposed between the supporting part 20 and the lifting block 61 of the lift unit 60 or the fixed bracket 41 of the fiber chucking part 40.

With this configuration, a process of fastening (attaching) the glass tube assembly 19 to the metal sleeve 16 will be described hereinbelow.

First, the locking pin 37b is released from the slit 37a by rotating upwardly, and then the movable block 32 is rotated outwardly from the fixed block 31 on the axis of the first hinge part 34. Thereafter, the metal sleeves 16 are inserted into corresponding holders 31a, and the movable block 32 is rotated toward the fixed block 31. Then, the locking pin 37b is inserted into the slit 37a, thereby preventing the metal sleeves 16 fitted into the holders 31a from being separated from the holders 31a. At this time, the movable block 32 pushes the metal sleeve 16 against the fixed block 31.

After the metal sleeves 16 are fitted into the holders 31a, the glass tube assemblies 19 are inserted into the corresponding metal sleeves 16. Then, the fibers 13 each provided in the corresponding glass tube assemblies 19 are passed through the corresponding fiber passing part 50a of the fiber guiding block 50 and chucked by the fiber chucking part 40.

That is, the fiber 13 is disposed on the first chucking plate 41a of the fixed bracket 41 in a state that the movable bracket 42 is rotated outwardly from the fixed bracket 41, and then the movable bracket 42 is rotated toward the fixed bracket 41 on the axis of the second hinge part 43 and locked onto the fixed bracket 41 by magnetically coupling the magnet 44 provided in the other end of the movable bracket 42 to the other end of the fixed bracket 41 so that the fibers 13 are chucked between the first and second chucking plates 41a and 41b.

After the fibers 13 are chucked by the fiber chucking part 40, the free end parts of the fibers 13 are wound on a winding part 22 of the supporting part 20, respectively.

Thereafter, as shown in FIG. 4A, the user holds the handle 67 to rotate the link part 65 at a predetermined angle to allow the short radius part of the cam 64 to push the upper part of the lifting block 61 so that the lifting block 61 moves up toward the supporting block 63 due to the rotation of the cam 64. An enlarged view of a portion 4b of the sleeve grip part 30 is explained in FIG. 4B.

Then, as shown in FIG. 4B, the glass tube assembly 19 is lifted from the metal sleeve 16 at a predetermined height "H", and an injection device 69 injects an epoxy resin 17 between the glass tube assembly 19 and the metal sleeve 16.

Thereafter, the user holds the handle 67 to rotate the link part 65 at a predetermined angle to allow the long radius part of the cam 64 to push the upper part of the lifting block 61 as shown in FIG. 5A. An enlarged view of another portion 5b of the sleeve grip part 30 is explained in FIG. 5B. The lifting block 61 moves down away from the supporting block 63 due to the rotation of the cam 64 as shown in FIG. 5B.

Thus, while the glass tube assembly 19 is moved downwardly and inserted into the metal sleeve 16 completely, the epoxy resin 17 injected between the glass tube assembly 19 and the metal sleeve 16 is hardened. With this configuration, if the glass tube assembly 19 is reciprocated inside the metal sleeve 16, the epoxy resin 17 is spread between the glass tube assembly 19 and the metal sleeve 16, thereby fastening (fixedly attaching) the glass tube assembly 19 to the metal sleeve 16 firmly.

As described above, according to the present invention, a glass tube assembly is conveniently fastened into a metal sleeve. Further, not only is the reliability of a collimator increased but also the time of manufacturing the collimator is reduced, and the plurality of collimators are produced at once, thereby increasing the productivity thereof.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An apparatus for manufacturing a collimator by attaching a glass tube assembly including a pigtail having a fiber and a GRIN lens coaxially arranged with the pigtail to a sleeve having a tube shape, comprising:
   a supporting part;
   a sleeve grip part connected to the supporting part and having at least one holder holding and supporting the sleeve therein;
   a fiber chucking part disposed above the sleeve grip part and chucking the fiber of the glass tube assembly by specified distances; and
   a lift unit lifting and lowering the fiber chucking part so as to control the glass tube assembly inserted in the metal sleeve to move in first and second direction a longitudinal direction of the metal sleeve,
   wherein the sleeve grip part comprises:
      a fixed block formed with the holder recessed along a lengthwise direction thereof; and
      a movable block having one end rotatably coupled to one end of the fixed block and the other end removably coupled to the other end of the fixed block to hold the metal sleeve in the holder.

2. The apparatus according to claim 1, wherein the fiber chucking part includes:
   a fixed bracket having a first chucking plate; and
   a movable bracket having one end rotatably coupled to one end of the movable bracket, the other end removably coupled to the other end of the fixed bracket, and a second chucking plate chucking the fiber in cooperation with the first chucking plate of the fixed bracket.

3. The apparatus according to claim 1, wherein the lift unit comprises:
   a lifting block coupled to the fiber chucking part to move up and down together with the fiber chucking part;
   a pair of supporting blocks each having one end slidably engaged with the lifting block and the other end supported by the supporting part;
   a cam disposed between the supporting blocks above the lifting block, and having an asymmetric curvature with a variable radius so as to lift and lower the lifting block at a predetermined height due to a rotation thereof; and
   a link part linked to the cam and rotatably supported by the supporting blocks, having opposite ends exposed to an outside of the supporting blocks.

4. The apparatus according to claim 1, wherein the supporting part comprises a winding part around which a free end part of the fiber is wound.

5. An apparatus for manufacturing a collimator including a tube and a glass tube assembly containing a GRIN lens, a pigtail, and a fiber extended from the glass tube assembly to be inserted into the tube, comprising:
   a supporting part;
   a sleeve grip part mounted on the supporting part to hold and support the tube;
   a fiber chucking part movably mounted on the supporting part, supporting the fiber of the tube assembly, and moving toward and away from the sleeve grip part in a direction parallel to an axis of the tube and by specified distances; and
   a lift unit mounted on the supporting part to control the fiber chucking part to move in the direction with respect to the sleeve grip part to allow the tube assembly to be disposed within the tube,
   wherein the lift unit comprises:
      a lifting block movably mounted on the supporting part to be coupled to the fiber chucking part;
      a supporting block mounted on the supporting part;
      a cam having a surface contacting the lifting block; and
      a link part rotatably coupling the cam to the supporting block.

6. The apparatus according to claim 5, further comprising an injection device mounted on the supporting part and disposed adjacent to the sleeve grip part to inject an epoxy resin into a space between the tube assembly and the tube.

7. The apparatus according to claim 5, further comprising a guiding block mounted on the supporting part between the sleeve grip part and the fiber chucking part, having a guide hole to guide a portion of the fiber disposed between the glass tube assembly and the fiber chucking part when the fiber is supported by the fiber chucking part and when the glass tube assembly is inserted into the tube.

8. The apparatus according to claim 5, wherein the fiber chucking part comprises:
   a fixed bracket slidably mounted on the supporting part; and
   a movable bracket detachably attached to the fixed bracket to hold the fiber of the glass tube assembly.

9. The apparatus according to claim 8, wherein the fixed bracket comprises a first magnet, and the movable bracket comprises a second magnet disposed to correspond to the first magnet when the movable bracket is attached to the fixed bracket to hold the fiber of the glass tube assembly.

10. The apparatus according to claim 9, wherein the sleeve grip part comprises a fixed block mounted on the supporting part and a movable block detachably attached to the fixed block, and the fixed block and the movable block having respective magnets disposed to correspond to each other when the movable block is attached to the fixed block to hold the tube.

* * * * *